United States Patent
Smith

(10) Patent No.: US 8,837,256 B2
(45) Date of Patent: Sep. 16, 2014

(54) SUBTERRANEAN SURVEY COMMUNICATION SYSTEM AND TECHNIQUE

(75) Inventor: Brian David Smith, Holywood (IE)

(73) Assignee: WesternGeco L.L.C., Houston, TX (US)

( * ) Notice: Subject to any disclaimer, the term of this patent is extended or adjusted under 35 U.S.C. 154(b) by 1069 days.

(21) Appl. No.: 12/193,037

(22) Filed: Aug. 17, 2008

(65) Prior Publication Data

US 2010/0039896 A1 Feb. 18, 2010

(51) Int. Cl.
*G01V 1/00* (2006.01)
*G01V 1/22* (2006.01)

(52) U.S. Cl.
CPC .............. *G01V 1/22* (2013.01); *G01V 2200/14* (2013.01)
USPC ........................................................ 367/76

(58) Field of Classification Search
CPC .............................. G01V 1/22; G01V 2200/14
USPC ..................................................... 367/76–80
See application file for complete search history.

(56) References Cited

U.S. PATENT DOCUMENTS

| | | | |
|---|---|---|---|
| 6,226,601 B1 | 5/2001 | Longaker | |
| 6,560,565 B2 | 5/2003 | Roy et al. | |
| 7,020,701 B1 * | 3/2006 | Gelvin et al. | 709/224 |
| 7,292,943 B2 | 11/2007 | Elder et al. | |
| 7,379,386 B2 | 5/2008 | Muyzert et al. | |
| 2006/0265489 A1 * | 11/2006 | Moore | 709/223 |
| 2008/0080310 A1 * | 4/2008 | Eperjesi et al. | 367/77 |

OTHER PUBLICATIONS

PCT Search Report, dated Mar. 22, 2010, Application No. PCT/US2009/053439.

* cited by examiner

*Primary Examiner* — Krystine Breier

(57) ABSTRACT

A technique includes acquiring data, which is indicative of operations that are being conducted in connection with a subterranean survey. The technique includes communicating the data in real time over a long range communication network to allow at least one remote user to remotely observe the operations.

17 Claims, 4 Drawing Sheets

SUBTERRANEAN SURVEY COMMUNICATION SYSTEM AND TECHNIQUE

BACKGROUND

The invention generally relates to a subterranean survey communication system and technique.

Seismic exploration involves surveying subterranean geological formations for hydrocarbon or mineral deposits. A survey typically involves deploying seismic source(s) and seismic sensors at or near predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones or accelerometers), and seismic surveys may deploy only one type of sensors or both. In response to the detected seismic events, the sensors generate electrical signals to produce seismic data. Processing and analysis of the seismic data can then indicate the presence or absence of probable locations of hydrocarbon or mineral deposits.

SUMMARY

In an embodiment of the invention, a technique includes acquiring data, which are indicative of operations that are being conducted in connection with a subterranean survey. The technique includes communicating the data in real time over a long range communication network to allow at least one user to remotely observe the operations.

In another embodiment of the invention, a system includes a first subsystem and a second subsystem. The first subsystem is located near a site in which subterranean survey operations are being conducted, and the second subsystem is remotely located with respect to the site. The first and second subsystems are adapted to communicate data in real time over a long range communication network to allow at least one user to remotely observe the operations.

In yet another embodiment of the invention, an article includes a computer readable storage medium that stores instructions that when executed by a processor-based system cause the processor-based system to acquire data in real time from a long range communication network. The data is indicative of operations that are being conducted in connection with a subterranean survey. The instructions when executed cause the processor-based system to selectively route the data to users based on detected data types.

Advantages and other features of the invention will become apparent from the following drawing, description and claims.

DETAILED DESCRIPTION

A land-based seismic survey may be associated with a number of operations related to the mobilization of the survey, the actual survey itself and the demobilization of the survey. The mobilization initially includes negotiations between the survey operator and the customer, which involve the price structure, the deliverables and the quality standards. Prior to and after these negotiations, the seismic survey operator may review maps, which detail the physical layout of the survey site, as well as conduct physical surveys on the site for such purposes of determining receiver and source coordinates for the survey. Additional operations that may be involved with the mobilization of the survey may include clearing operations, to remove obstructions, such as vegetation, or create vehicle access routes; operations to obtain global positioning satellite (GPS) coordinates of the planned receiver and source positions; the coordination and mobilization of the crews, equipment and supplies for the survey; and logistical operations to deliver the equipment (drilling rigs, seismic vibrators, supply trucks, etc.), supplies and crews to the survey site.

The seismic survey operator furnishes certain deliverables to the customer. As examples, the customer may receive such deliverables as the raw acquired seismic survey measurement data, as well as the time and location at which the data were acquired. The deliverables may include products that are the result of processing the raw seismic data, as well as various measurements and/or test results, which characterize the overall quality of the acquired seismic data.

The actual seismic survey may be performed by several crews that operate from one or more base or field camps on the survey site. During the survey, the crews may drill various bores for purposes of installing the seismic sources or receivers, and the crews may also place the receivers at the locations set forth in the parameters for the job. Thus, a particular shot from a seismic source at a given location may be recorded by a certain group of receivers; and then, the source or receivers may be located to their next positions for purposes of recording another shot. Various status and/or performance reports may be prepared and delivered to the survey operator during the performance of the survey. As examples, these reports may indicate crew performance, as well as the overall progress and quality of various aspects of the ongoing survey.

A significant amount of personnel involvement may be required for the demobilization of the survey. In this regard, a considerable number of personnel may be involved in equipment and supply removal as well as operations that are directed to site restoration.

Figure 1:
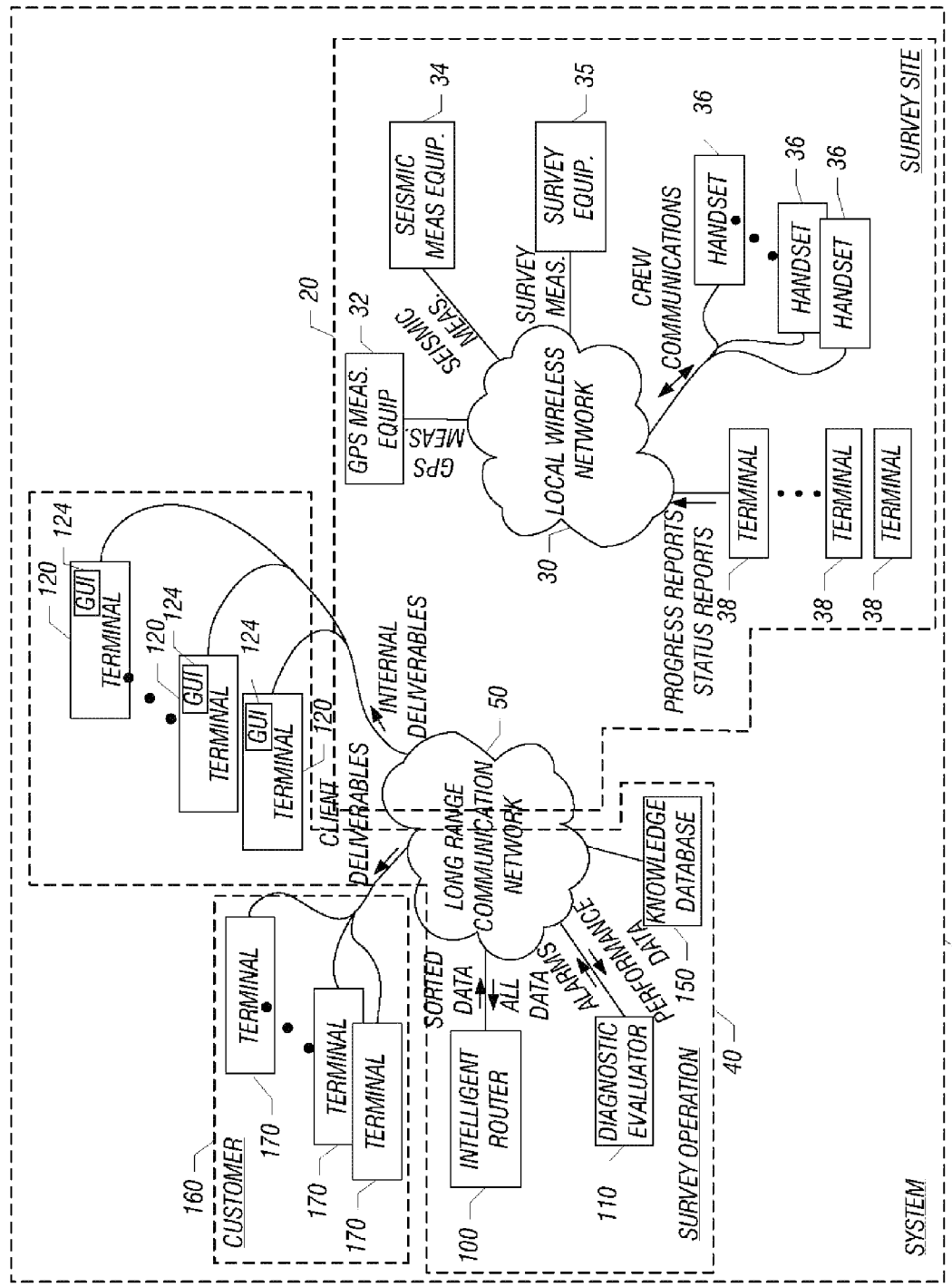
FIG. 1 is a schematic diagram of a communication system used in connection with a subterranean survey to monitor, investigate and report on survey operations according to an embodiment of the invention.

Referring to FIG. 1, in accordance with embodiments described herein, a system 10 may be used for purposes of communicating data that are acquired in association with a seismic survey in real time to one or more remotely-located observers, or "users". As described herein, the users who receive the data may be personnel of the survey operator who are located at the survey site, as well as the survey operator's personnel who are remotely located at the operator's central office or other locations. Personnel of the customer may also receive some of this data.

The data that are acquired in association with the survey may include all data that relates to the operations that are performed in the mobilization and demobilization of the survey, as well as the operations that are performed in the survey. For example, this data includes traditional seismic measurement data, such as acquired seismic pressure and possibly particle motion measurement data, as well as data that identifies the time and location at which the seismic data are acquired. The data acquired in association with the seismic survey also includes data that are not directly connected to the acquired seismic data, such as data that contains digitized crew communications; crew survey progress and, status reports; etc. The data associated with the seismic survey may also include other types of data, such as land survey measurement data, GPS measurement data, messages requesting certain supplies or equipment; messages communicating crew or equipment problems; etc.

As a more specific example, in accordance with embodiments of the invention, a communication subsystem 20 of the system 10 is located at the survey site for purposes of acquiring the various data associated with the survey operations and communicating this data to a long range communication network 50 (the Internet, for example). The subsystem 20 may include a local wireless network 30 (a WiFi or WiMax network, as examples), which receives data that are associated with the seismic survey, and the wireless network 30 transmits this data in real time to the long range communication network 50. In this regard, the long range communication network 50 may communicate the data received from the local wireless network 30 over a relatively long distance (on the order of tens, hundreds or thousands of miles, as examples) to end observers, or users, at the operator and customer, as further described below.

The local wireless network 30 receives the data from various sources, such as, for example, GPS measuring equipment 32 and seismic measuring equipment 34, which have wireless transceivers for this purpose, as an example. Thus, the GPS measuring equipment 32 may include transceivers that transmit data, such as survey coordinates obtained in the planning of the survey, as well as the specific coordinates of the actual receiver and source locations that are actually used in the survey. The seismic measuring equipment 34, may include, as an example, transceivers that communicate with the seismic receivers for purposes of communicating acquired seismic data, as well as the time at which the seismic data was acquired to the wireless network 30. The local wireless network 30 may also communicate with land survey equipment 35.

The data transmitted by the wireless network 30 over the long range communication network 50 may include digitized voice communications. For example, each crew member may have a wireless handset 36, which is capable of digitizing speech and transmitting the digitized speech data to the other handsets and to the wireless network 30. Additionally, the wireless handsets 36 may be used for non-speech communication. In this regard, using the wireless handsets 36, the crew may send data or text messages, emails or may conduct voice communications with other handsets 36. It is noted that the wireless handsets 36 may also communicate computer-generated data or messages that are not in a text format. Some or all of the communications may be received by the wireless network 30 and communicated to the long range communication network 50. These voice communications may be intended for someone at the remote central office, as well as possibly being intended for a base camp office. Examples of additional data that may be transmitted to the wireless network 30 includes data transmitted by computer terminals 38 at the base camp offices. As examples, the data may include progress and/or status reports; equipment and/or supply requests; problem reports; etc.

The system communication devices, such as the handsets 36, of the communication subsystem also permit two-way communication between someone who is remote to the survey site (such as someone local to the subsystem 10) and someone who is located at the survey site.

In accordance with embodiments of the invention described herein, the system 10 includes a subsystem 40 that is located near or at the survey operator's central office. In general, the subsystem 40 is coupled to the long range communication network 50 to analyze and route the data communicated from the subsystem 20 to the end users. In some embodiments of the invention, the subsystem 40 includes an intelligent router 100 that is coupled to the long range communication network 50 for purposes of sorting the data received over the network 50 and delivering the received data to the appropriate end users. For example, the intelligent router 100 may recognize that some of the data constitutes the deliverables, such as the seismic data, the seismic data timestamps, etc.; and the intelligent router 100 may selectively route this data to the customer as well as to various personnel of the survey operator.

It is noted that in accordance with some embodiments of the invention, deliverables, such as the acquired seismic data, may first be analyzed by the survey operator for such purposes as seismic data processing, detecting any performance anomalies, etc. before the data is transmitted to the customer.

As another example of the routing by the intelligent router 100, the router 100 may recognize that a particular voice message is intended for a particular user (a mechanic at the survey operator's office, for example) and direct the message accordingly. As another example, the intelligent router 100 may recognize the status and progress reports and direct these reports to the appropriate personnel at the operator's site. Thus, in general, the intelligent router 100 sorts the incoming data from the long range network 50 and routes the sorted data back through the communication network 50 or other network(s) to the appropriate personnel, including personnel at the client and operator.

In accordance with some embodiments of the invention, the subsystem 40 includes a diagnostic evaluator 110 that evaluates the data received over the long range communication network 50 from the subsystem 20 for purposes of determining if the data complies with certain performance metrics. For example, in accordance with some embodiments of the invention, the diagnostic evaluator 110 examines the acquired seismic measurement data to determine if the seismic data is outside of the boundaries established by a given set of performance metrics. The diagnostic evaluator 110 may also evaluate other data, such as, for example, data that is indicative of crew performance (data indicative of certain performance metrics, for example). Thus, the diagnostic evaluator 110 may alert personnel of the operator when a particular crew at the survey site is underperforming, for example.

In some embodiments of the invention, the operator's personnel at the central office use computer terminals 120 (of the subsystem 40) for purposes of monitoring operations associated with the seismic survey. More specifically, each terminal 120 may contain one or more microprocessors that execute instructions to display a graphical user interface (GUI) 124 at the terminal's monitor, which allows the operator's personnel to evaluate the ongoing survey operation in real time and take the appropriate action.

For purposes of researching past solutions to specific survey-related problems and reducing the response time for solving future problems, the subsystem 40 includes a knowledge database 150, which may be coupled to the long range communication network 50 in some embodiments of the invention. In this regard, as further described below, by way of the GUI 124, a user may research past problems and solutions in the knowledge database 150 to find a solution for a current problem, as well as update the knowledge database 150 when solutions to new problems are discovered.

As also shown in FIG. 1, in accordance with embodiments of the invention, the customer may have a subsystem 160 that includes terminals 170 that are coupled to the long range communication network 50 or another network for purposes of receiving certain data associated with the seismic survey in real time. The intelligent router 100 may control which client deliverables are delivered to the terminals 170, in accordance with embodiments of the invention.

Figure 2:
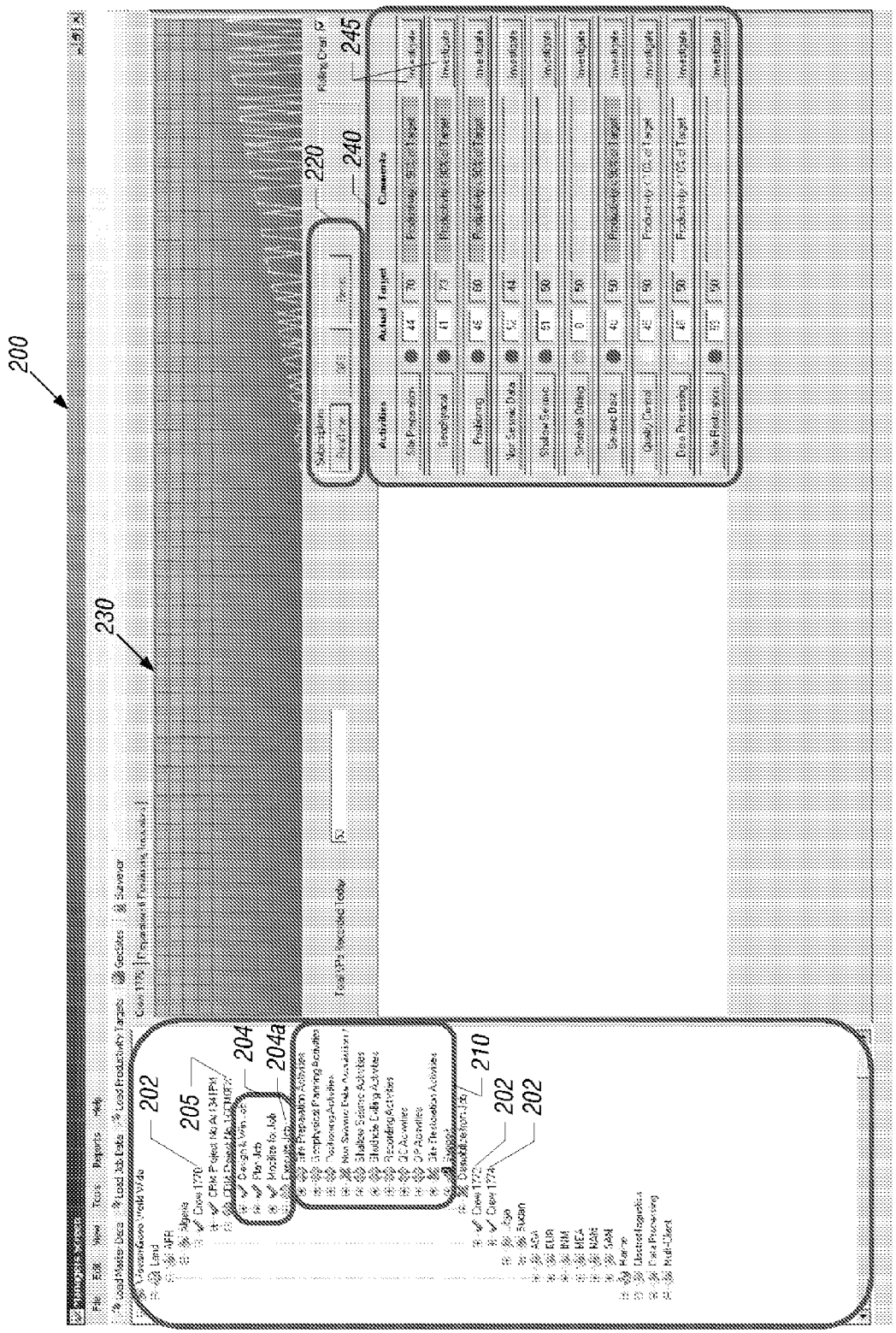
FIG. 2 is an illustration of a window generated by a graphical user interface of the system of FIG. 1, which allows a remotely located user to monitor different aspects of a seismic survey in real time according to an embodiment of the invention.

Referring to FIG. 2, in accordance with some embodiments of the invention, the GUI 124 (see FIG. 1) may produce a window 200 on the terminal 120 (see FIG. 1) for purposes of monitoring various aspects of the survey in real time, such as crew performance (as a non-limiting example). In this regard, the window 200 may include drop down menus, which includes selectors 202, to select a particular crew. For the example depicted in FIG. 2, "crew 1770" is selected, and below the selection are various projects being performed by the crew at the survey site. A particular project 205 may be selected, which causes several other selectors 204 to be displayed for purposes of monitoring the design, plan, mobilization or execution by the crew. For the example depicted in FIG. 2, a selector 204a, which is associated with a job execution, may be selected to expand additional selectors 210 for purposes of monitoring the specific activities that are being performed by the selected crew. It is noted that these activities include such activities as site preparation, shallow seismic activities, shothole drilling activities, recording activities, site restoration activities, etc.

The window 200 may also include selectors 220 related to subscriptions to which the user may subscribe to receive information about selected processes. Additionally, the window 200 may include a field 230 for monitoring the acquired seismic data and information flow. Additionally, certain performance metrics of the selected crew may be examined in a region 240 of the window 200. The data displayed in the region 240 corresponds to the selected crew and project number.

Each line in the region 240 identifies a particular activity, the target performance metric and the actual performance metric. Furthermore, each line includes a field identifying whether the target has been met. As depicted in FIG. 2, the activities may include site preparation, geophysical activity, positioning activities, non-seismic data activities, shallow seismic activities, shothole drilling activities, seismic data activities, quality control activities, data processing activities and site restoration activities.

Figure 3:
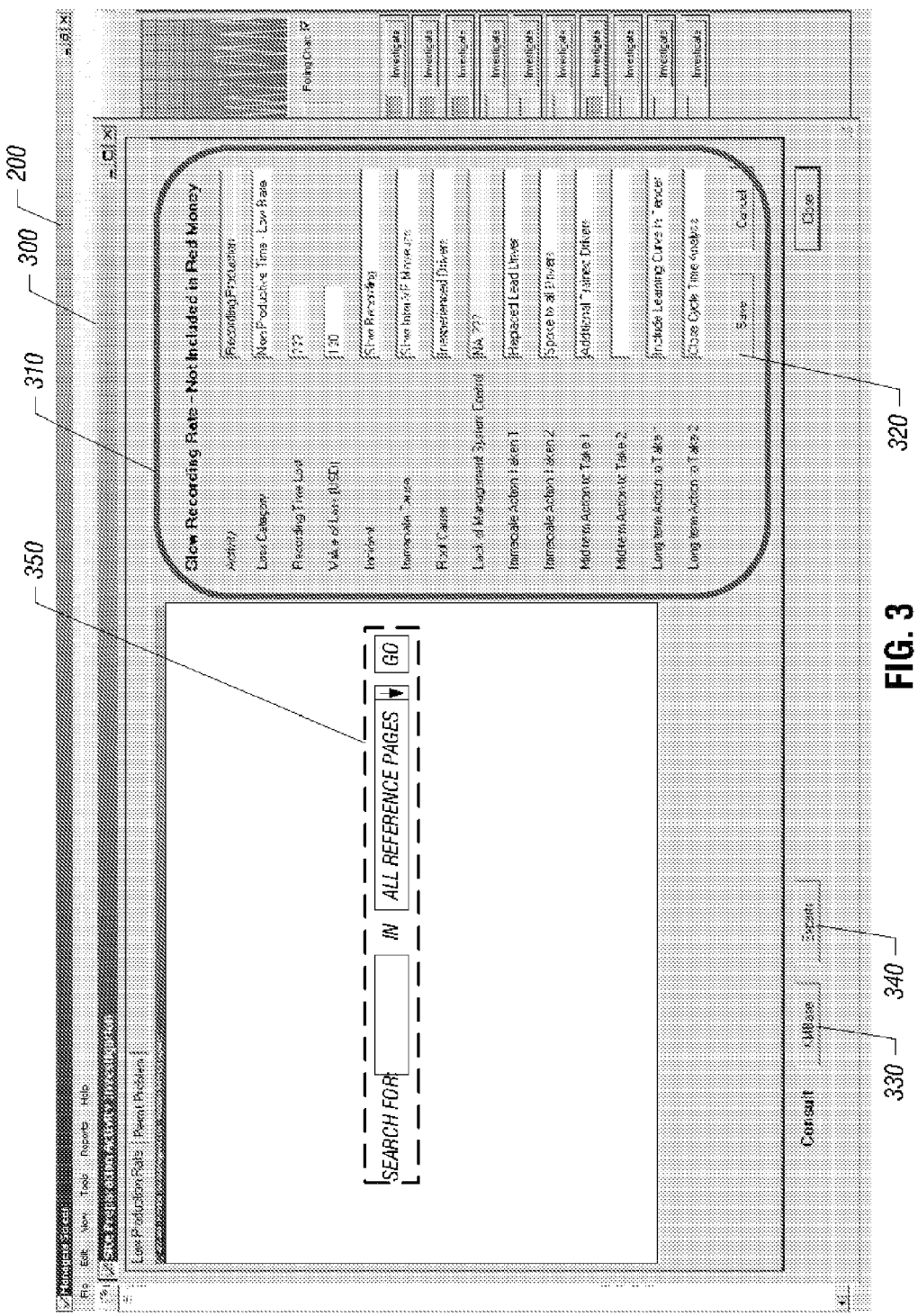
FIG. 3 is an illustration of a window generated by a graphical user interface of the system of FIG. 1, which allows a remotely located user to investigate a performance problem with a seismic survey according to an embodiment of the invention.

When productivity fails to meet expectation, the user may investigate the failure via an associated investigation selector 245. Thus, as shown in FIG. 2, each line in the region 240 may be associated with an investigation selector 245. By "clicking" on a particular investigation selector 245, the GUI 124 opens another window 300 (which is depicted in FIG. 3) that lists various details in the investigated activity. The window 300 includes a region 310, which details the problem and permits the user to enter information related to the problem. For example, as shown in the FIG. 3, the investigated activity relates to recording production and is due to the productive time being at a sufficiently low rate. The root cause of the incident was due to inexperienced drivers. Furthermore, the region 310 shows the solution: the driver was replaced and the other drivers received additional training. After a new solution is determined, the solution may be saved by clicking on the save selector 320 for purposes of storing the solution in the knowledge database 150.

It is noted that in accordance with some embodiments of the invention, the solution to the problem may be determined by consulting the knowledge database 150 (see also FIG. 1) via a selector 330. Additionally, the window 300 includes a selector 340 for purposes of consulting in real time with experts about the problem. The window 300 also includes a search engine, as indicated by a search field 350, for purposes of submitting an inquiry to the knowledge database 150.

Figure 4:
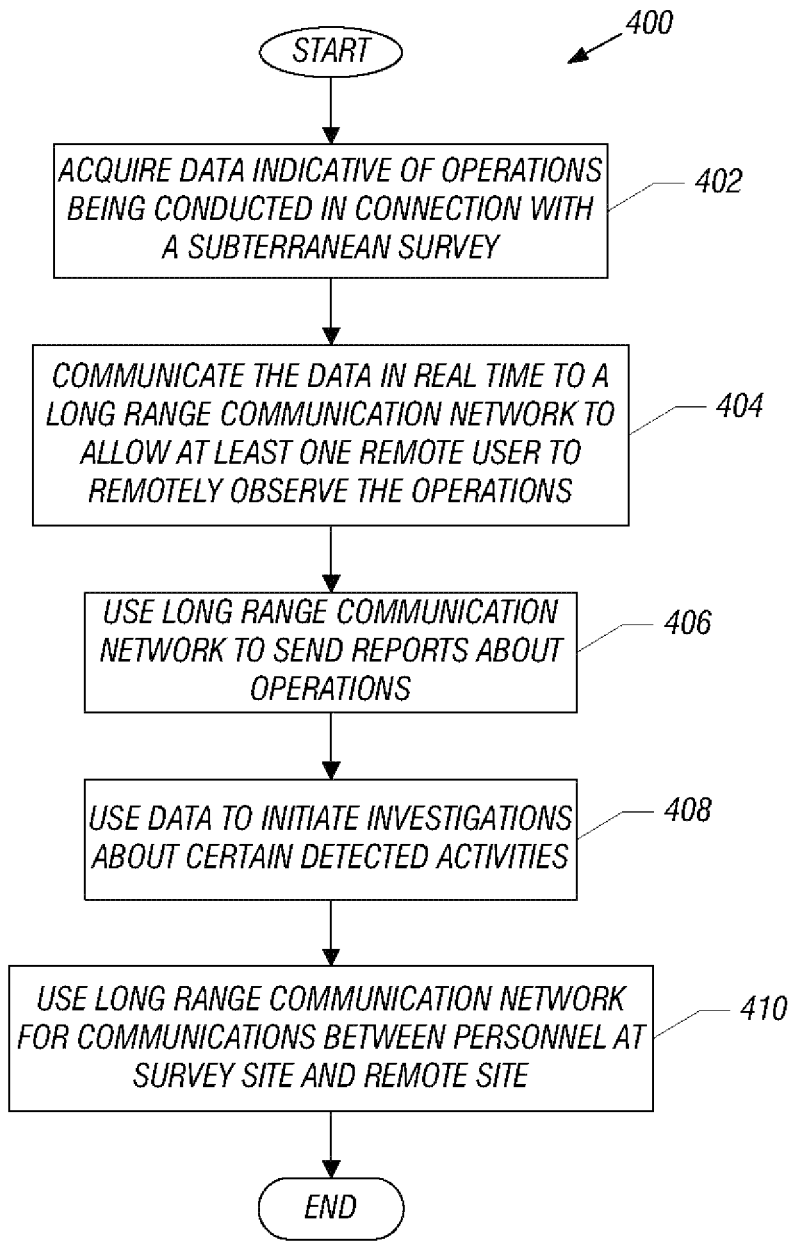
FIG. 4 is a flow diagram depicting a technique used in connection with a subterranean survey according to an embodiment of the invention.

Thus, to summarize, in accordance with embodiments of the invention described herein, a technique 400 that is depicted in FIG. 4 includes acquiring (block 402) data, which is indicative of operations being conducted in connection with a seismic survey and communicating (block 404) the data in real time over a long range communication network to allow at least one user to remotely observe the operations. The technique 400 may also include using (block 406) the long range communication network 50 to send reports about the operations, and using (block 408) the communicated data to initiate investigations about certain flagged detected activities. Furthermore, the technique 400 may include using (block 410) the long range communication network 50 for communications (two-way communications, for example) between personnel at the survey site and personnel at the remote site.

Other embodiments are within the scope of the appended claims. For example, although a land-based survey has been described herein for purposes of example, it is understood that the system 10 may be used in connection with surveys other than land surveys. For example, the techniques and systems that are disclosed herein may likewise be applied to a "marine" survey that is conducted in a marine environment. It is noted that a "marine" survey may be conducted not only in salt water but also in fresh and brackish waters. In one type of marine survey, called a "towed-array" survey, an array of seismic sensor-containing streamers and sources is towed behind a survey vessel. As an example, the local wireless network 30 of FIG. 1 may be located on one or more vessels to receive data in connection with the seismic survey and communicate the data to the long range communication network 50, similar to the process described above for the land based survey. Thus, many variations are contemplated and are within the scope of the appended claims.

The seismic survey is just one example of a subterranean survey to investigate geophysical properties of subterranean function(s). In accordance with other embodiments of the invention, the system and techniques that are disclosed herein may also be used to monitor, investigate and report operations associated with a non-seismic subterranean survey, such as an electromagnetic survey (as a non-limiting example).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   acquiring data indicative of operations being conducted in connection with a subterranean survey;
   communicating the data in real time over a long range communication network;
   receiving the data from the long range communication network; and
   using a processor-based machine to automatically compare performance metrics indicated by the received data with predetermined thresholds to selectively generate alarms to indicate performance of a crew conducting the survey.

2. The method of claim 1, wherein the subterranean survey comprises a seismic survey.

3. The method of claim 1, wherein the act of communicating comprises communicating the data over the Internet.

4. The method of claim 1, further comprising:
   receiving the data from the long range communication network; and
   processing the data to automatically and selectively route the data to a group of users based on detected data types.

5. The method of claim 1, further comprising:
   providing a database to store data indicative of problems associated with performance metrics and associated solutions to the problems.

6. The method of claim 1, wherein the operations comprise operations associated with setting up the survey.

7. The method of claim 1, wherein the operations comprise operations occurring during the survey.

8. The method of claim 1, wherein the operations comprise operations occurring after the survey.

9. A system usable with a first subsystem being located in proximity to a site in which subterranean survey operations are being conducted, the system comprising:
   a second subsystem being remotely located with respect to the site,
   the second subsystem being adapted to:
      receive data in real time over a long range communication network from the first subsystem; and
      automatically compare performance metrics indicated by the received data with predetermined thresholds to selectively generate alarms to indicate performance of a crew conducting the survey.

10. The system of claim 9, wherein the subterranean survey operations comprise seismic survey operations.

11. The system of claim 9, wherein the second subsystem is adapted to process data received from the long range communication network automatically and selectively route the data to a group of users based on detected data types.

12. The system of claim 9, wherein the second subsystem comprises a database to store data indicative of problems associated with performance metrics and associated solutions to the problems.

13. The system of claim 9, wherein the operations comprise at least one of the following: an operation occurring before the survey, an operation occurring during the survey and an operation occurring after the survey.

14. An article comprising a computer readable storage medium storing instructions that when executed by a processor-based system cause the processor-based system to:
   acquire data in real time from a long range communication network, the data identifying a progress of a survey crew in connection with a an ongoing subterranean survey; and
   automatically compare performance metrics indicated by the acquired data with predetermined thresholds to selectively generate alarms to indicate performance of a crew conducting the survey.

15. The article of claim 14, wherein the storage medium stores instructions that when executed by the processor-based system cause the processor-based system to search a database for problems associated with performance metrics and associated solutions to the problems.

16. The article of claim 14, wherein the operations comprise at least one of the following: an operation occurring before the survey, an operation occurring during the survey and an operation occurring after the survey.

17. The method of claim 1, further comprising:
   communicating the data over the long range network for a distance of at least ten miles between a site associated with the ongoing survey and a remote site at which said at least one user is located.

* * * * *